3,471,927
LINING OF DENTAL CAVITY
Harry H. Eisenberg, 806 S. 1st St.,
Champaign, Ill. 61820
No Drawing. Filed May 2, 1966, Ser. No. 546,533
Int. Cl. A61k 5/00
U.S. Cl. 32—15                                                  4 Claims

ABSTRACT OF THE DISCLOSURE

A tooth cavity liner composition containing 10% to 30% by weight benzyl alcohol for neutralizing anions between the tooth surface and the surface of the filling and preventing dehydration of the tooth and 70% to 90% by weight lower aliphatic alcohol diluent.

---

This invention relates to new and useful dental cavity linings and especially to a surface-active composition and its use in the preparation of a tooth for filling so as to prevent marginal leakage.

As is well known, acids produced by foods, and especially carbohydrates, have a tendency to break down tooth enamel when remnants of food and bacteria are allowed to remain on the surface of the tooth. Dilution or neutralization of the hydrogen ion concentration on the surface can help prevent tooth breakdown. It is deduced that carious teeth are more electropositive than non-carious teeth, and the electropositive condition causes decalcification of the enamel. Bacteria in carious lesions liberate hydrogen ions which must be neutralized in a cavity in addition to removing gross and minute tooth structure and totally disinfecting prior to restoring the tooth.

Even after careful clinical operation in preparing a cavity for filling, microscopic particles still remain in abundance on the floor, marginal walls or supporting walls of the cavity. For example, it has been shown that gross debris of 20 microns in size and even submicroscopic particles of 0.1 micron exist in cavities even after the most careful dental procedures. The presence of any particle of food debris in a cavity to be filled can interfere with adhesion of the filling material within the cavity. True adhesion in a cavity requires a neutrally clean and relatively smooth surface. Marginal leakage, i.e. between the tooth and filling, can be caused by failure to reduce or eliminate hydrogen ion concentration at the cavity walls or a failure to provide smooth walls for receiving the filling material. Many of the cavity liner compositions in use today either do not prepare the tooth cavity wall as a sufficiently smooth wall for receiving the filling or do not eliminate sufficient hydrogen ion concentration. Further, many such cavity lining materials either fail to provide cleaning action for removal of debris, break down over extended periods of use, adversely affected the filling material, and/or irritate the tooth pulp.

It is a general object of this invention to provide a new and improved composition for the purpose of lining a dental cavity in preparation for filling the cavity.

Another object of this invention is to provide such a lining composition which does not break down over extended periods of time and does not irritate the tooth material.

Yet another object of this invention is to provide such a lining composition which sterilizes and neutralizes the cavity in preparation of the cavity for filling and which retains the cavity in a sterilized and neutralized state and effectively prevents marginal leakage after filling.

Still another object of this invention is to provide a surface-active composition for lining a tooth cavity for improving adhesion of the filling material to the tooth material.

A further object of this invention is to provide a new and useful filling and tooth structure in which a lining of any of the foregoing objects is provided between the filling and tooth materials to seal against marginal leakage.

A still further object of this invention is the use of the liner of any of the foregoing objects by providing a technique for treating a cavity in a tooth for receiving a filling in which the cavity is coated with the lining material of any of the foregoing objects.

Other objects will be apparent from the following description of the invention.

The present invention provides a liner composition which functions to sterilize and neutralize the tooth cavity. The liner composition is used in the usual manner by applying to the surfaces of a tooth cavity so that when the cavity is filled the liner forms a sealing layer between the filling and tooth. The liner functions to seal the tooth against marginal leakage so that water and other liquids are effectively excluded. Further, the lining material does not create a caustic environment between the tooth and filling and is, at the same time, effective in eliminating hydrogen ion concentration. The filling materials used in this invention can be any of those normally used and available, e.g., metal filling materials such as amalgams and foils or synthetic resin materials such as a solution of polymethyl methacrylate in methyl methacrylate monomer or other acrylic filling materials which are usually catalyzed with a peroxidic polymerization initiator. Suitable filling materials are commercially available and well known to those in the art.

The cavity liner composition comprises a mixture of isoelectric compounds including an ionic aromatic alcohol such as benzyl alcohol (also known as phenyl carbinol) and a lower aliphatic alcohol, e.g., in the $C_1$ to $C_6$ range. The aromatic alcohol is of the type having a highly active aromatic ring, such as the phenyl ring, so that the aromatic alcohol will readily combine with and neutralize anions between the tooth surface and filling surface. The activity of the aromatic alcohol is also advantageous in sterilizing the cavity interior and in priming the tooth cavity surface, both to seal the dential tubules and to improve the adhesion or bonding of the filling material, particularly to the dentine of the tooth. The liner composition is non-irritating, and the aromatic alcohol actually provides a sedative effect at the dentine portion of the tooth. Where synthetic resins are used, these are usually of the polyester type, including ester polymers such as the acrylic ester polymers mentioned above; and the liner composition appears to interreact with the synthetic resin, either physically or chemically, to assure more complete sealing between the tooth material and the filling. This interreaction is believed to be by chemical reaction of the highly reactive aromatic alcohol with available carboxyl groups, or the like, in the synthetic resin to form ester linkages between the liner and the synthetic resin filling material.

The aliphatic alcohols include, for example, methanol, ethanol, hexanol, glycol, 1,2-butane diol, glycerol, trimethylol ethane, and the like. The aliphatic alcohol, or even the aromatic alcohol, can contain water in amounts of a few percent by volume, e.g., up to 8–10%. Usually the lower aliphatic alcohols will contain up to 4 or 5% water because of their natural affinity for absorption of water from the surrounding atmosphere. Isopropyl alcohol is particularly preferred because of the good germicidal properties it imparts to the composition and its excellent tooth wetting properties. Also, isopropyl alcohol is a good solvent for the preferred aromatic alcohol, i.e., benzyl alcohol.

The aromatic and aliphatic alcohols are included in the compositions in balanced amounts relative to each other. The amount of aromatic alcohol is sufficient to provide proper oiliness to the composition to prevent dehydration of the tooth material by the aliphatic alcohol. The amount of aromatic alcohol is also sufficient to provide the desired sterilization and neutralization characteristics to the composition but is insufficient to increase the viscosity of the composition to the extent that it may lose proper wetting characteristics. The aliphatic alcohol is included in an amount sufficient to solubilize or dilute the aromatic alcohol to a viscosity providing good tooth wetting characteristics. The particular amounts used in each instance will depend on the properties of the particular aliphatic and aromatic alcohols, e.g., the viscosity of both alcohols, the dehydration effect and wetting ability of the aliphatic alcohol, and the neutralization and sterilization abilities of the aromatic alcohol. Further, although the preferred benzyl alcohol is non-irritating, the aromatic alcohols should be used in amounts insufficient to unduly irritate the tooth pulp. When using the preferred benzyl alcohol and isopropyl alcohol, it has been found that compositions containing about 10–30% by weight benzyl alcohol and 70–90% by weight isopropyl alcohol are highly advantageous.

The following examples are offered for the purpose of illustrating the present invention and are not intended to be limiting thereon.

EXAMPLE I

A liner composition was prepared by mixing 20 parts by weight benzyl alcohol with 80 parts by weight isopropyl alcohol. A cavity was drilled in a tooth in the usual manner, and the walls of the cavity were coated with the liner composition. A gold foil was pounded into the lined cavity by usual tooth filling procedures. Ammonia is given off during the filling with gold foil, and the ammonia did not materially affect the lining material or create an undesirable caustic condition within the cavity. The lining material resisted the hot gold foil and the pressures of pounding during filling of the cavity. After the tooth was filled, it was found that the lining provided a water-impervious seal between the tooth and filling which did not deteriorate over an extended period of time when subjected to normal use in the environment of the patient's mouth.

EXAMPLE II

The procedure of Example I was repeated, except that after coating the cavity with the liner composition, an acrylic resin filling material was used to fill the cavity. The acrylic resin filling material was a commercially available and normally used material consisting generally of a methyl methacrylate polymer dissolved in methyl methacrylate monomer and activated with a peroxide catalyst system. When compared with the use of conventional and commercially available lining materials in combination with the same synthetic resin filling material, the liner material used in this example provided in excellent seal between the filling and tooth while the commercially available and conventionally used material permitted marginal leakage.

EXAMPLE III

The procedure of Example I was again repeated, except that the lined cavity was filled with a silver amalgam. Again, an excellent seal was obtained.

EXAMPLE IV

The composition prepared in Example I was mixed with a cement filling material to provide a filling compound for a tooth cavity. The tooth cavity was prepared by drilling, and the cement filling compound was used to fill the cavity. It was found that the lining composition provided an excellent seal between the cement filling and the tooth.

In each of the above examples, marginal leakage was found to be minimized even during use over an extended period of time. The seal between the filling and tooth was much better than that obtained with the conventional and commercially available cavity lining composition. In these and other experiments over a period of a number of years, it was found that the lining compositions provided by this invention were not nearly as irritatng as most of those commercially available. Additionally, the compositions have been found to have excellent solvency power for removing tooth decomposition, such as caused by bacteria, from the tooth cavity. Thus, during application of the composition, the composition can be used as a solvent or flushing agent to remove such products of decomposition. Further, the composition can be combined with cement filling materials in preparing inlay compositions and still performs effectively. When used with synthetic resin filling materials, the lining composition was found to eliminate a marginal leakage problem which occurs so often with conventional lining compositions that the synthetic resin materials are often not used by a practitioner at all. Thus, the present compositions, in addition to sterilizing and neutralizing cavities, enable wider use of synthetic resin filling materials in addition to the metallic and cement-type filling materials.

As additional advantages, the sterilizing power of the composition is greater than that of any of the present germicides at the practitioner's disposal, and sterilization is effected without dehydrating the tooth. The compositions aid in restoring the tooth without irritation of the sensitive dentine and generally stimulates repair of the tooth. Further, the composition neutralizes electrical charges within the cavity to make the cavity more receptive to the filling material and therefore reduce cavity in the material.

The foregoing detailed description is given for clearness of understanding only and no unnecessary limitations are to be understood therefrom, as some modifications will be obvious to those skilled in the art.

All percents given herein are percents by weight unless otherwise indicated.

I claim:
1. A sterilizing and neutralizing tooth cavity liner composition which is stable in use and non-irritating to the tooth pulp, consisting essentially of a liquid surface-active mixture of 10% to 30% by weight benzyl alcohol and 70% to 90% by weight a lower aliphatic alcohol, the amount of said benzyl alcohol being insufficient to render the composition non-wetting to the tooth material in the cavity and being sufficient to prevent dehydration of the tooth material by the aliphatic alcohol.

2. The composition of claim 1 wherein said aliphatic alcohol is isopropyl alcohol.

3. The composition of claim 2 containing 20 parts by weight benzyl alcohol for each 80 parts by weight isopropyl alcohol.

4. The composition of claim 1 including in the mixture a cement filling material for filling a tooth cavity.

References Cited

UNITED STATES PATENTS

| | | | |
|---|---|---|---|
| 1,562,834 | 11/1925 | Kruger | 106—35 |
| 3,254,411 | 6/1966 | Shelly | 32—15 |

OTHER REFERENCES

Dispensatory of the United States of America, copyright 1955, Lippincott Co., pages 158–159.

ROBERT PESHOCK, Primary Examiner

U.S. Cl. X.R.

106—35